United States Patent
Post et al.

(10) Patent No.: US 10,487,744 B2
(45) Date of Patent: Nov. 26, 2019

(54) FENCE FOR DUCT TONE MITIGATION

(71) Applicant: United Technologies Corporation, Farmington, CT (US)

(72) Inventors: Keith A. Post, Colchester, CT (US); Daniel W. Shannon, Glastonbury, CT (US); Steven H. Zysman, Amston, CT (US); Mark Zsurka, Utica, NY (US); Diego H. de la Riva, Vernon, CT (US); Sudarshan N. Koushik, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 639 days.

(21) Appl. No.: 15/161,953

(22) Filed: May 23, 2016

(65) Prior Publication Data

US 2017/0335771 A1 Nov. 23, 2017

(51) Int. Cl.
| | |
|---|---|
| *F02C 7/24* | (2006.01) |
| *B64D 29/00* | (2006.01) |
| *F01D 25/24* | (2006.01) |
| *F02C 3/04* | (2006.01) |
| *B64D 33/00* | (2006.01) |
| *B64C 23/06* | (2006.01) |

(52) U.S. Cl.
CPC .............. *F02C 7/24* (2013.01); *B64D 29/00* (2013.01); *B64D 33/00* (2013.01); *F01D 25/24* (2013.01); *F02C 3/04* (2013.01); *B64C 23/06* (2013.01); *F05D 2220/32* (2013.01); *F05D 2260/96* (2013.01)

(58) Field of Classification Search
CPC ... F02C 7/24; F02C 3/04; B64D 33/00; B64D 29/00; B64C 23/06; F01D 25/24; F05D 2260/96; F05D 2220/32
See application file for complete search history.

(56) References Cited

U.S. PATENT DOCUMENTS

| | | | |
|---|---|---|---|
| 3,484,847 A | 12/1969 | Poole | |
| 4,441,576 A | 4/1984 | Allen | |
| 4,456,204 A | 6/1984 | Hapke | |
| 4,844,695 A | 7/1989 | Banks | |
| 5,699,981 A | 12/1997 | McGrath | |
| 6,050,527 A * | 4/2000 | Hebert | B64C 23/00 137/15.1 |

(Continued)

FOREIGN PATENT DOCUMENTS

FR 1545957 11/1968

OTHER PUBLICATIONS

Extended EP Search Report for EP Appln. No. 17172558.3 dated Oct. 17, 2017.

(Continued)

*Primary Examiner* — Justin D Seabe
*Assistant Examiner* — Adam W Brown
(74) *Attorney, Agent, or Firm* — O'Shea Getz P.C.

(57) ABSTRACT

Aspects of the disclosure are directed to a system associated with an engine of an aircraft comprising: a duct, an inlet coupled to the duct, and a fence coupled to the inlet or located upstream of the inlet. In some embodiments, the system further comprises a valve body coupled to the duct. In some embodiments, the valve body includes at least one valve that is configured to rotate between a closed state and an open state.

16 Claims, 11 Drawing Sheets

(56) References Cited

U.S. PATENT DOCUMENTS

| | | | |
|---|---|---|---|
| 6,201,872 B1 | 3/2001 | Hersh | |
| 6,375,118 B1 | 4/2002 | Kibens | |
| 6,655,632 B1 | 12/2003 | Gupta et al. | |
| 6,739,554 B1 | 5/2004 | Stanek | |
| 6,973,193 B1 | 12/2005 | Tse et al. | |
| 7,990,287 B2 | 8/2011 | Bonutti | |
| 7,992,825 B2 | 8/2011 | Llamas Sandin | |
| 8,240,616 B2 * | 8/2012 | Miller | B64C 21/04 244/130 |
| 8,926,268 B2 * | 1/2015 | Fishler | F04D 29/4206 415/119 |
| 9,108,737 B2 * | 8/2015 | Zysman | B64D 33/00 |
| 2008/0203218 A1 | 8/2008 | Anderson et al. | |
| 2010/0126182 A1 * | 5/2010 | Hoover | F01D 17/105 60/785 |
| 2013/0186497 A1 * | 7/2013 | Royalty | B64D 13/02 137/899.2 |
| 2015/0321765 A1 | 11/2015 | Brochard et al. | |
| 2015/0361885 A1 | 12/2015 | Romano et al. | |
| 2016/0031290 A1 * | 2/2016 | Molin | F02K 1/827 165/44 |

OTHER PUBLICATIONS

Andrew Kempton, "Acoustic Liners for Modem Aero-Engines", Rolls-Royce, available from: <http://www.win.tue.nl/ceas-asc/Workshop15/CEAS-ASC_XNoise-EV_K1_Kempton.pdf>, 2011.

Mohammadreza Azimi, "Using Acoustic Liner for Fan Noise Reduction in Modern Turbofan Engines", Int'l J. of Aeronautical & Space Sci., 15(1), 97-101, 2014.

Li Yong, "Control Strategies for Aircraft Airframe Noise Reduction", Chinese Society of Aeronautics and Astronautics & Beihang University, Chinese Journal of Aeronautics, p. 249-260, Mar. 6, 2013.

L. Leylekian, "An Overview of Aircraft Noise Reduction Technologies", Journal Aerospace Lab, Issue 7, Jun. 2014.

Dennis L. Huff, "Noise Reduction Technologies for Turbofan Engines", NASA TM-2007-214495, Sep. 2007.

Aerodays, "Aerodays2015 Aviation in Europe—Innovating for Growth, The 7th European Aeronautics Days OPENAIR", London, Oct. 20-23, 2015.

* cited by examiner

FENCE FOR DUCT TONE MITIGATION

BACKGROUND

Gas turbine engines, such as those which power aircraft, employ a compressor to compress air that is drawn into the engine and a turbine to capture energy associated with the combustion of a fuel-air mixture. The engine is housed within a structure that is referred to as a nacelle. The nacelle is supported by a pylon that connects to a structure (e.g., a wing) of an aircraft.

One or more ducts may be associated with the nacelle or pylon. For example, a so-called pre-cooler duct may be coupled to the nacelle/pylon. The pre-cooler duct is used to route a fluid, such as air. For example, the air is received at an inlet and is conveyed by the duct to a location downstream of the inlet, where the air is frequently conditioned for other uses (e.g., aircraft cabin cooling).

As a result of the configuration described above, one or more acoustic tones may be generated when there is little or no flow being ingested by the inlet. For example, a fundamental tone/frequency and harmonics thereof may be generated as a result of a coupling between turbulence in a separated flow (e.g., a shear layer) over the duct intake (e.g., the inlet) and the duct response. At a minimum, the tone and its harmonics represent a nuisance or an observable source of noise. However, if the coupling is sufficiently large (e.g., if the coupling is proximate to a resonant condition), the tonal output may result in degraded performance or functionality of components associated with the aircraft.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine of an aircraft comprising: a duct, an inlet coupled to the duct, and a fence coupled to the inlet or located upstream of the inlet. In some embodiments, the fence has a height that is substantially uniform over a length of the fence. In some embodiments, the fence includes a plurality of segments. In some embodiments, each of the segments has a length that is substantially the same. In some embodiments, each of the segments has a maximum height and a minimum height, and the minimum height is less than the maximum height. In some embodiments, the fence includes a plurality of serrations. In some embodiments, each of the serrations has substantially the same length. In some embodiments, each of the serrations has substantially the same height. In some embodiments, the fence has a thickness and a height measured from a surface that is substantially uniform over the thickness. In some embodiments, the fence has a thickness and a height measured from a surface that varies over the thickness. In some embodiments, the system further comprises a valve body coupled to the duct. In some embodiments, the valve body includes at least one valve that is configured to rotate between a closed state and an open state. In some embodiments, the system further comprises a bifurcator coupled to the inlet. In some embodiments, the system further comprises a nacelle coupled to a pylon. In some embodiments, the system further comprises a second fence coupled to the inlet or located upstream of the inlet, the second fence located axially downstream from the fence. In some embodiments, the fence has a first length and the second fence has a second length that is different from the first length.

BRIEF DESCRIPTION OF THE DRAWINGS

The present disclosure is illustrated by way of example and not limited in the accompanying figures in which like reference numerals indicate similar elements. The drawings are not necessarily drawn to scale unless specifically indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with aspects of the disclosure, apparatuses, systems, and methods are directed to one or more spoilers/fences used to control output audio tones associated with a duct. In some embodiments, a fence may prevent a flow (e.g., a turbulent flow) from obtaining a resonant state/condition with respect to an acoustic response of the duct. In this manner, the output amplitude of the tones may be reduced to acceptable levels, such as for example levels that are less than one or more thresholds. The threshold(s) may be selected based on an application environment, one or more requirements, etc. A fence (which may also be referred to herein as a flow fence) may present a purposeful obstruction in a flow so as to favorably modify that flow.

Figure 1:
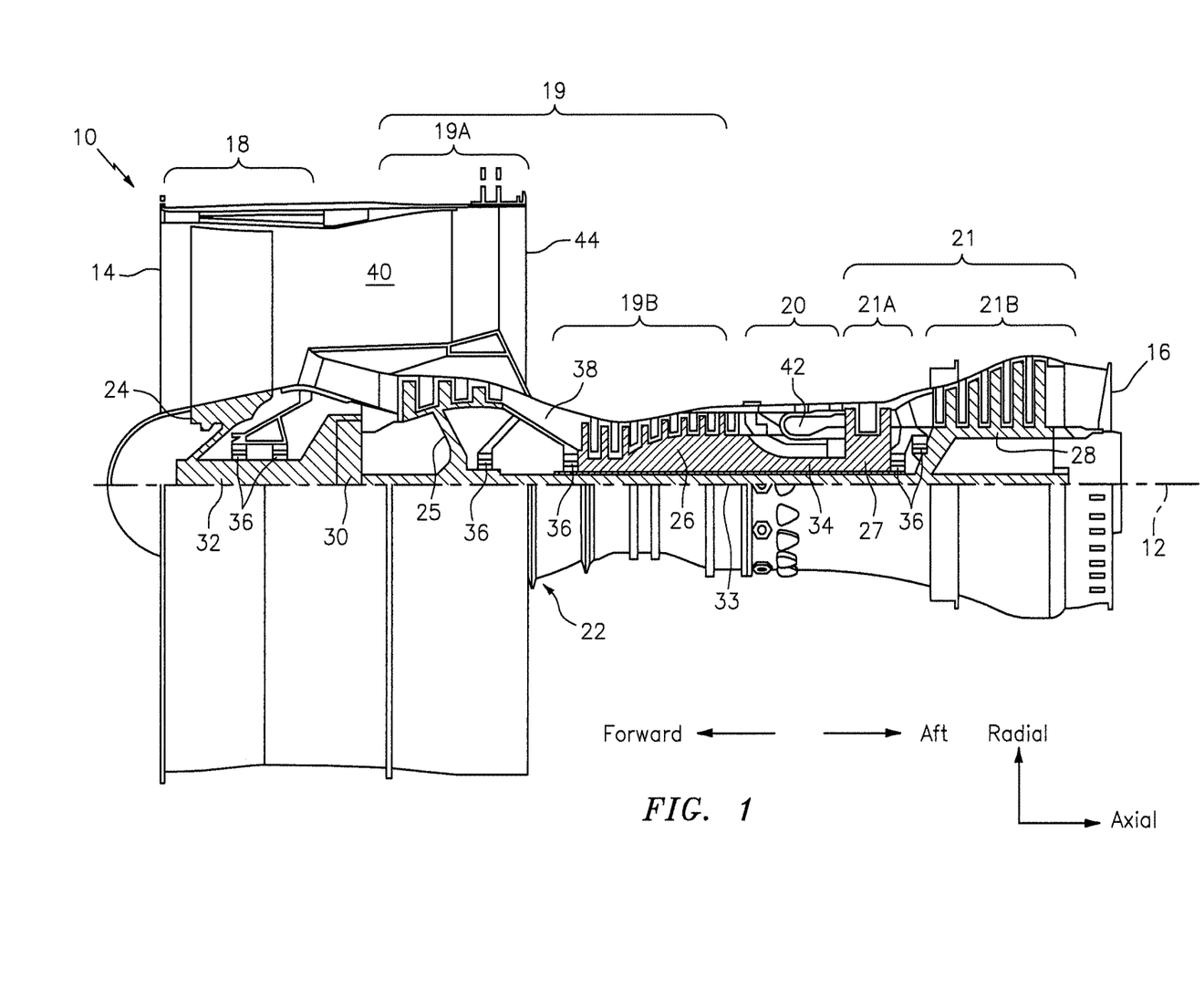
FIG. 1 is a side cutaway illustration of a geared turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines. Aspects of the disclosure may be applied in connection to other flow surfaces, where such surfaces may, or might not, be associated with an engine.

Referring to FIGS. 2A-2E, a system 200 in accordance with aspects of this disclosure is shown. In particular, the system 200 may include a nacelle, a portion of which is shown via reference character 202. The nacelle 202 may be used to house an engine, such as for example the engine 10 of FIG. 1.

The nacelle 202 may be coupled to a pylon via a bifurcator 210. The bifurcator 210 may cover the pylon internal structure when the nacelle 202 is closed over an engine (e.g., engine 10 of FIG. 1).

The bifurcator 210 (or the nacelle 202) may be coupled to a duct 218. The duct 218 may be used to convey a fluid, such as air. The duct 218 may be coupled to a valve body 226 that may house one or more valves, such as for example a valve 230. The valve 230 is shown in a (substantially) closed state in FIG. 2D. The valve 230 is shown in an at least partially open state in FIG. 2E. The valve 230 may be configured to rotate between the closed and open states. When in the valve 230 is in the closed state, the fluid may be prevented from traversing the duct 218. Conversely, when the valve 230 is at least partially open the fluid may traverse the duct 218.

The duct 218 may be coupled to an inlet 234. The inlet 234 may take the form of, or include, a scoop or intake orifice as would be known to one of skill in the art.

Figure 2A:
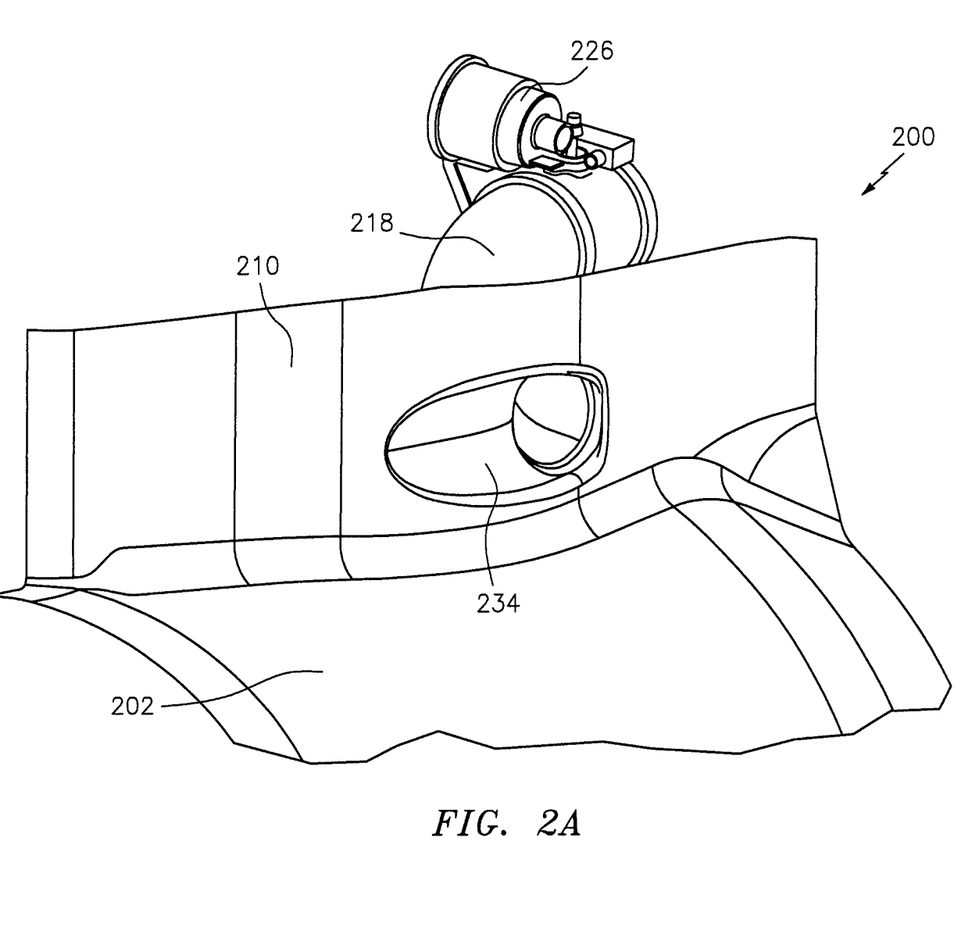
FIG. 2A illustrates a side perspective view of a system incorporating a portion of a nacelle, a pylon, a duct, a valve body, and an inlet when viewed from an exterior of the nacelle.
Figure 2B:
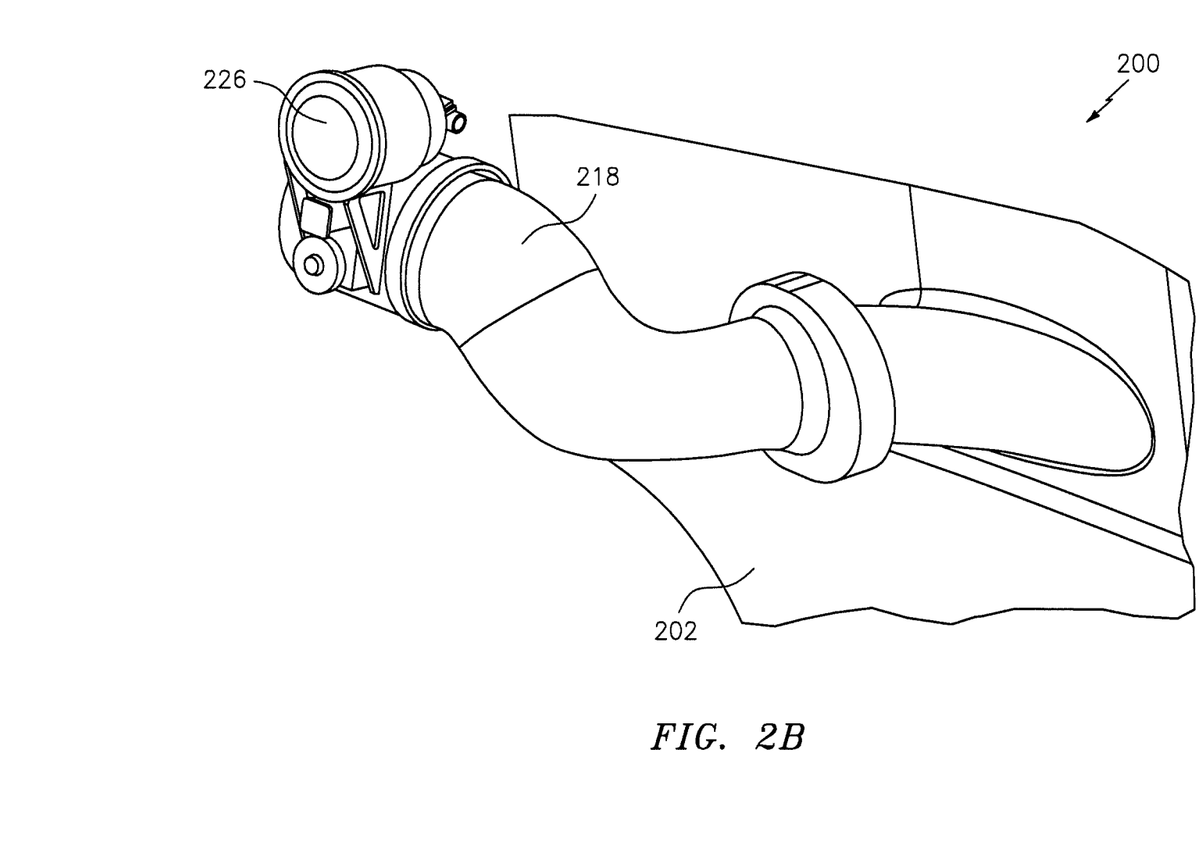
FIG. 2B illustrates a side perspective view of the system of FIG. 2A when viewed from an interior of the nacelle.
Figure 2C:
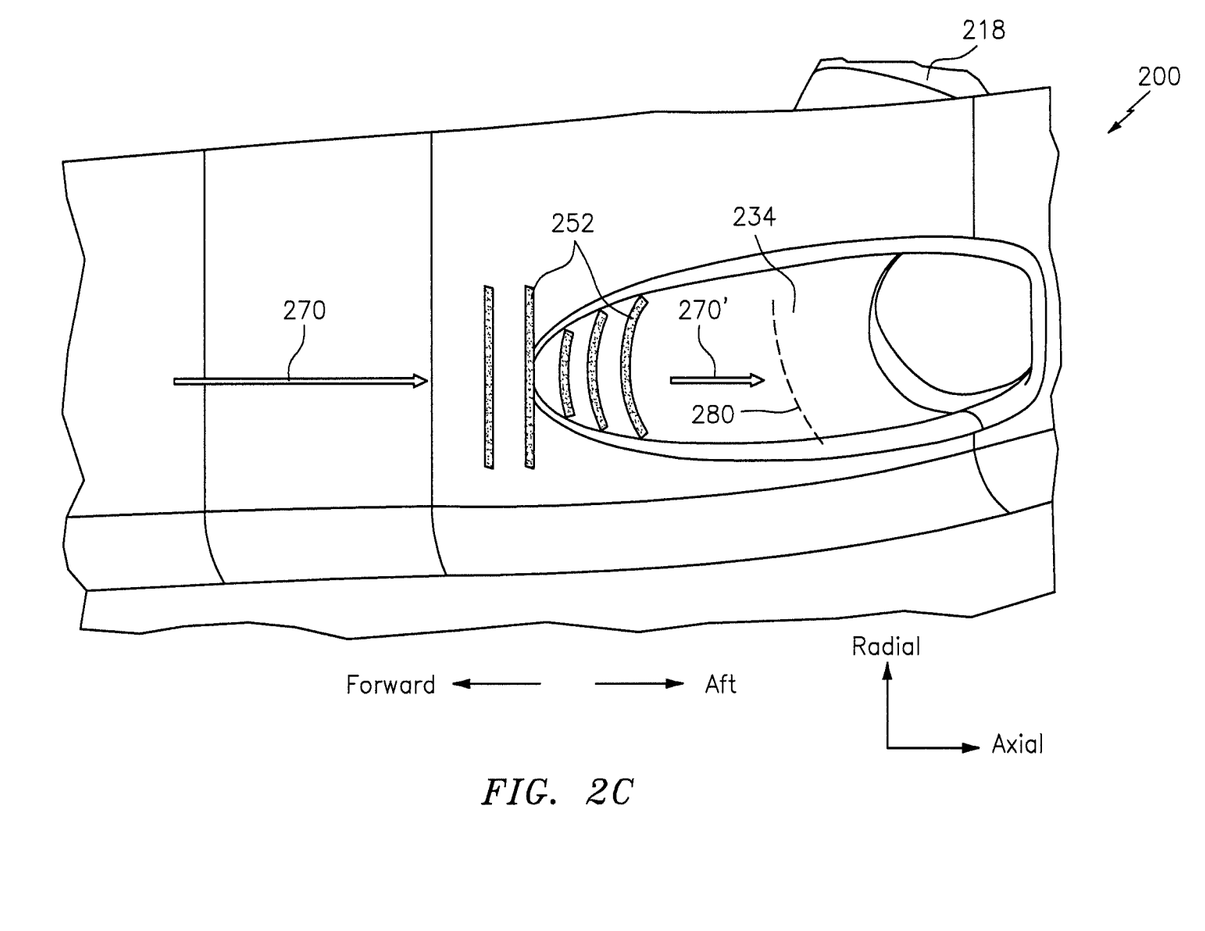
FIG. 2C illustrates a side perspective view of the system of FIG. 2A and demonstrates the use of one or more fences in association therewith.

As shown in FIG. 2C, the system 200 may include one or more fences 252. As shown in FIG. 2C, a fence 252 may assume a substantially flattened profile. A fence 252 may be located with, or proximate to, the inlet 234. A fence 252 may be manufactured and coupled to the inlet 234 (or the bifurcator 210) using one or more techniques to affect an inlet flow 270. For example, manufacturing and fabrication techniques that may be used may include casting, machining, use of an adhesive or tape, welding, etc.

Also superimposed in FIG. 2C is the flow 270. The flow 270 may be indicative of air that may enter the inlet 234 for conveyance by the duct 218. The fence(s) 252 may be disposed such that at least one characteristic of the flow 270 is conditioned (e.g., altered) by the fence(s) 252 as is described further below. This conditioning of the flow 270 by the fence(s) 252 is reflected as a secondary flow 270' that is modified from the original flow/state 270. As described further below in relation to FIGS. 5A-5B, one or more separation points (e.g., separation point 280) may be associated with the flow 270 and/or the flow 270'; the fences 252 may be located upstream of the separation point(s) 280.

Figure 3A:
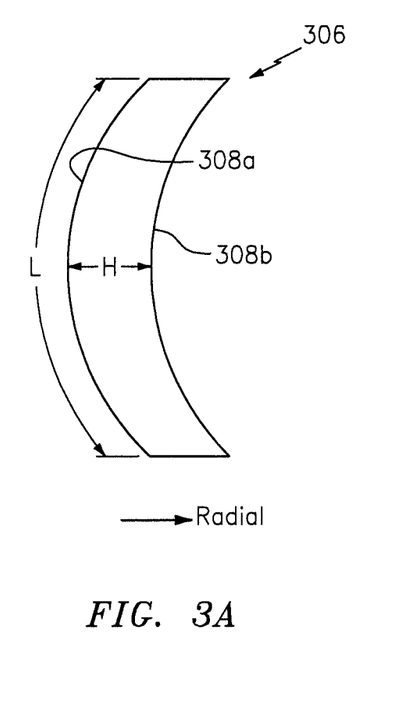
FIGS. 3A-3C illustrate various profiles of a fence that may be used in accordance with aspects of this disclosure.

Referring to FIG. 3A, a first profile/embodiment 306 of a first fence 252 in accordance with an embodiment is shown. As part of the profile, the fence 252 is shown as having a length L and a height H. The profile 306 may be referred to as a "smooth profile" in the sense that the height H may be substantially uniform over the length L. This consistency may allow for ease in the manufacture of the fence 252.

Referring to FIGS. 2C and 3A, a first surface 308a of the first fence 252 may interface to the inlet 234 or upstream of the inlet 234; a second surface 308b of the first fence 252 may interface to the flow 270 and/or the flow 270'. The curved shape/profile of the inlet 234 and the surface 308a is illustrative; other shapes/profiles may be used.

Figure 3B:
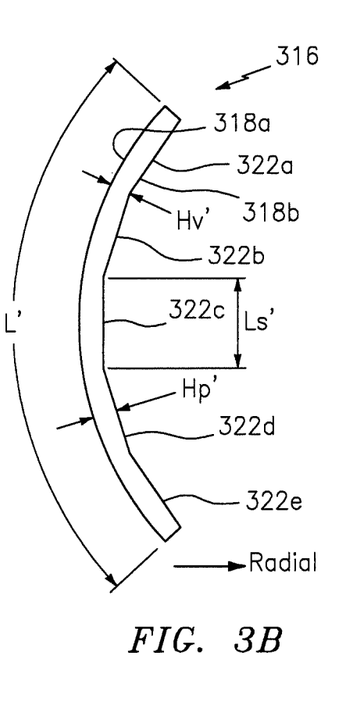

FIG. 3B illustrates a second profile/embodiment 316 of a second fence 252. In FIG. 3B, the fence 252 is shown as being composed of segments, such as for example segments 322a-322e. In this respect, the profile 316 may be referred to as a "segmented profile". In FIG. 3B, the fence 252 has an overall length L' (which may be the same as the length L of FIG. 3A). Each of the segments may have a length Ls'. Each of the segments may have a maximum/peak height Hp' and a minimum height Hv'. In some embodiments, multiple values for the length Ls', peak height Hp', or the minimum height Hv' may be used, which is to say that two or more of the segments might not be uniform relative to one another.

Referring to FIGS. 2C and 3B, a first surface 318a of the second fence 252 may interface to the inlet 234 or upstream of the inlet 234; a second surface 318b of the second fence 252 may interface to the flow 270 and/or the flow 270'. The surface 318a may be smooth/continuous, much like the surface 308a of the first fence 252 of FIG. 3A, to facilitate ease in interfacing, e.g., the inlet 234 and the second fence 252 of FIG. 3B.

Figure 3C:
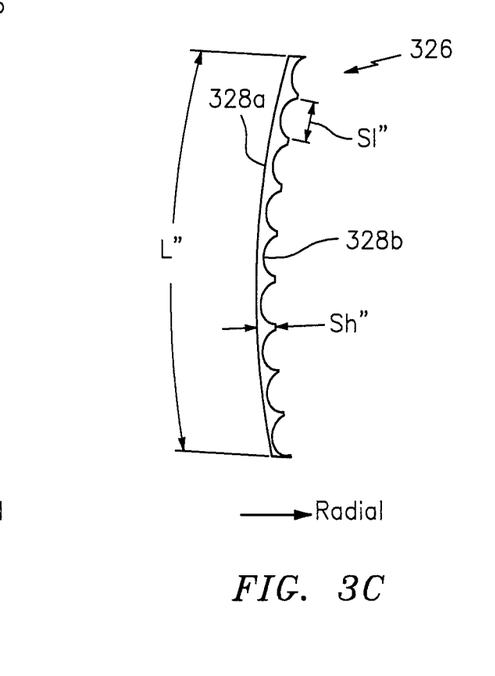

FIG. 3C illustrates a third profile/embodiment 326 of a third fence 252. The profile 326 may be referred to as a "serrated profile" in view of the shape of the third fence 252 shown in FIG. 3C. In FIG. 3C, the fence 252 has an overall length L" (which may be the same as the length L of FIG. 3A or the length L' of FIG. 3B). The profile 326 depicts the third fence 252 as having a serration length Sl" and a serration height Sh". In some embodiments, multiple values for the serration length Sl" or the serration height Sh" may be used, which is to say that the profile 316 might not be uniform in terms of the serrations over the length L" of the third fence 252.

Referring to FIGS. 2C and 3C, a first surface 328a of the third fence 252 may interface to the inlet 234; a second surface 328b of the third fence 252 may interface to the flow 270 and/or the flow 270'. The surface 328a may be smooth/continuous, much like the surface 308a of the first fence 252 of FIG. 3A, to facilitate ease in interfacing, e.g., the inlet 234 and the third fence 252 of FIG. 3C.

Figure 4A:
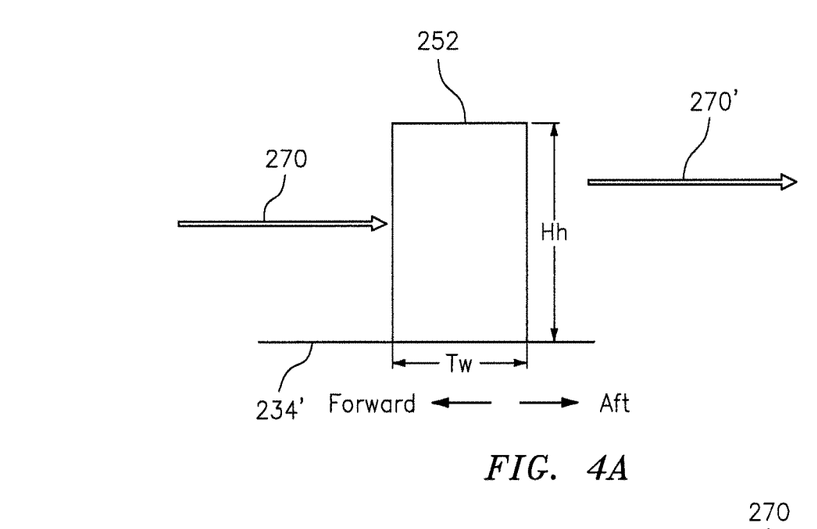
FIGS. 4A-4B illustrate perspective views of a flow about fences in accordance with aspects of this disclosure.

Referring now to FIG. 4A, a side perspective view of the flow 270 about a fence 252 and the modified flow 270' downstream of a spoiler 252 is shown. In particular, in FIG. 4A the fence 252 is shown as projecting from a surface 234' in an amount coinciding with a height Hh of the fence 252. The height Hh may be substantially uniform over a thickness (Tw) of the fence 252. The surface 234' may correspond to a surface of an inlet (e.g. inlet 234 of FIGS. 2A and 2C) or a surface that is upstream of the inlet.

Figure 2D:
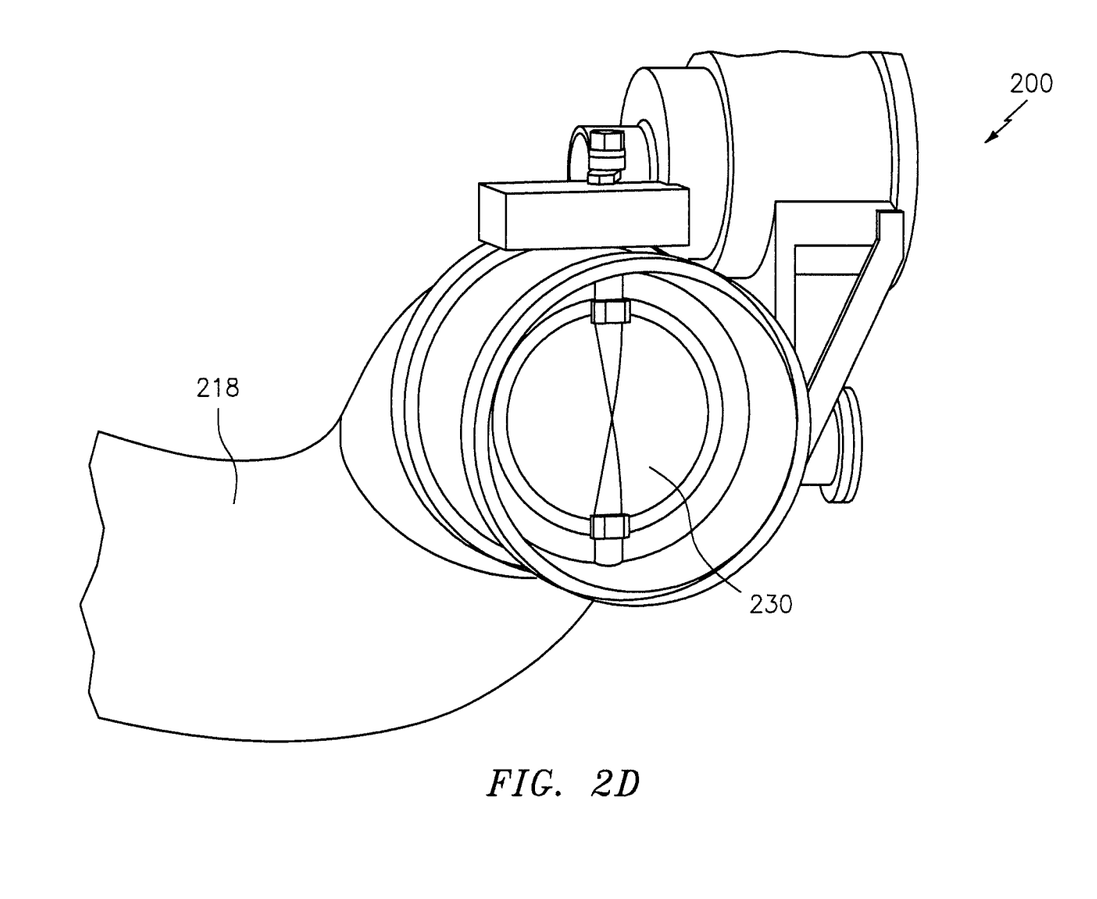
FIG. 2D illustrates a flapper valve of the system of FIG. 2A in a closed state.
Figure 2E:
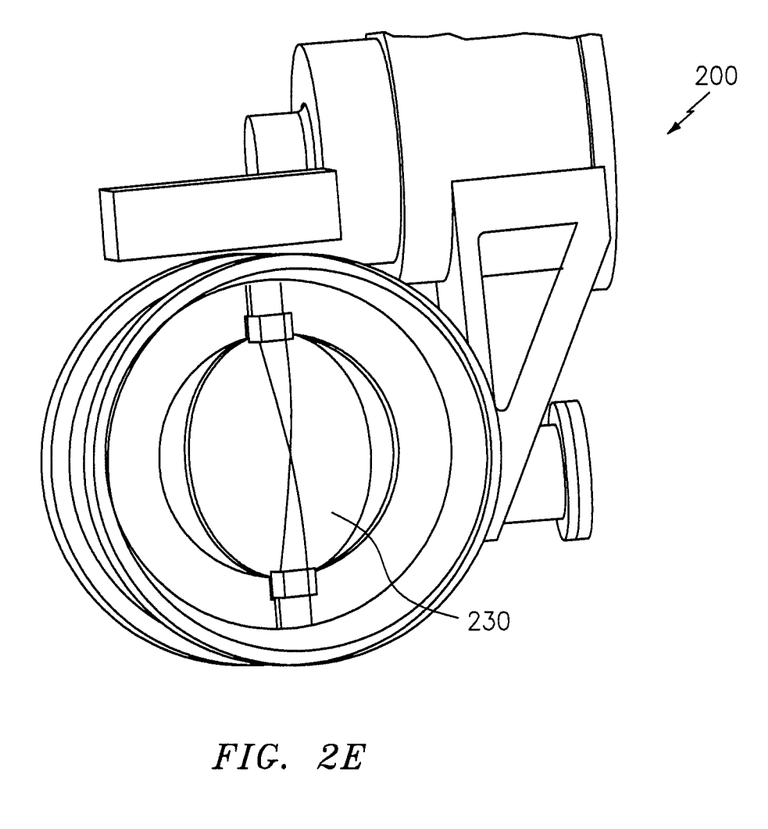
FIG. 2E illustrates the flapper valve of FIG. 2D in a partially open state.

As described above, the provisioning of the fence 252 may prevent the flow 270 from obtaining a resonant state/condition with respect to an acoustic response of the duct 218, such as for example when the valve 230 is substantially closed as shown in FIG. 2D. This acoustic response may be due to a number of resonance conditions based on the geometry of the inlet 234 and duct 218 as is familiar to one skilled in the art of acoustics (e.g., quarter wavelength modes, azimuthal modes, Helmholtz modes, etc.). However, the use of a constant height Hh as shown in FIG. 4A may have a tendency to impact the performance/efficiency of the system 200 when the valve 230 is at least partially open (see FIG. 2E).

Figure 4B:
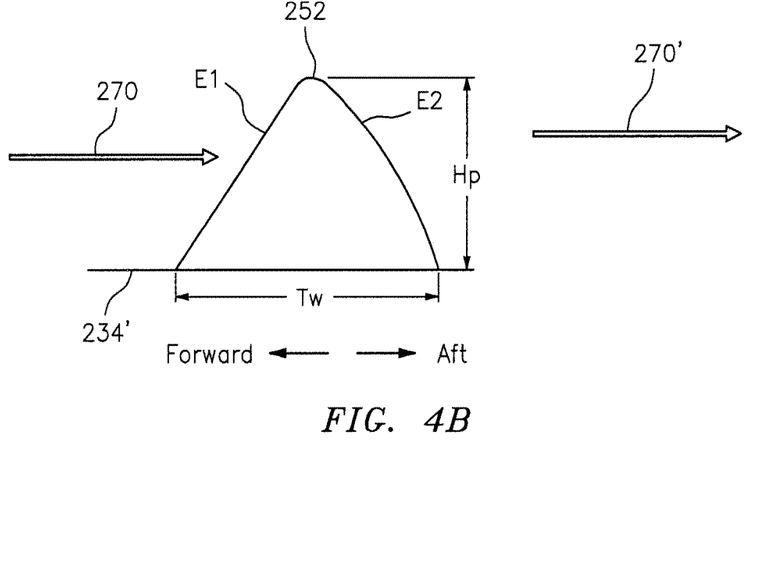

FIG. 4B illustrates another profile for a fence 252 that may be used. In contrast to FIG. 4A, in FIG. 4B the fence 252 is shown as including edges E1 and E2 that culminate at a peak height Hp. Relative to FIG. 4A, the profile shown in FIG. 4B (with the height of the fence 252 varying over the thickness Tw) may tend to improve the performance/efficiency of the fence 252 when the valve 230 is at least partially open. For example, the profile shown in FIG. 4B might not result in as much loss in terms of the flow 270' (relative to the flow 270).

One or more fences (e.g., fence 252) may be use to disrupt a coupling between an excitation caused by a flow (e.g., flow 270') and a cavity (e.g., duct 218 or inlet 234) open-close response. In this respect, a conditioning (altering) of the flow may be obtained as described above. This conditioning may include decreasing the magnitude of the coupling between the excitation and the cavity response.

Figure 5A:
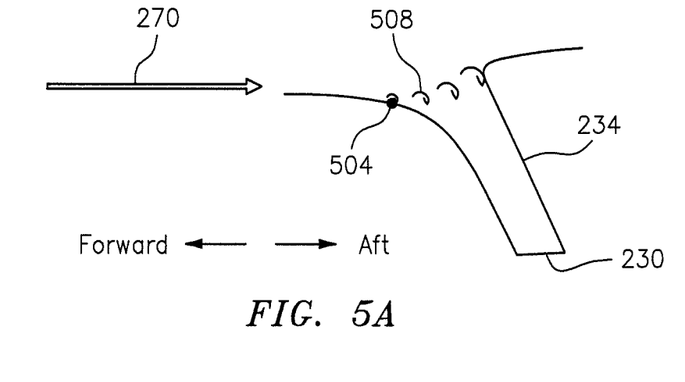
FIGS. 5A-5B illustrate a flow separation resulting in a shear layer in accordance with aspects of this disclosure.
Figure 5B:
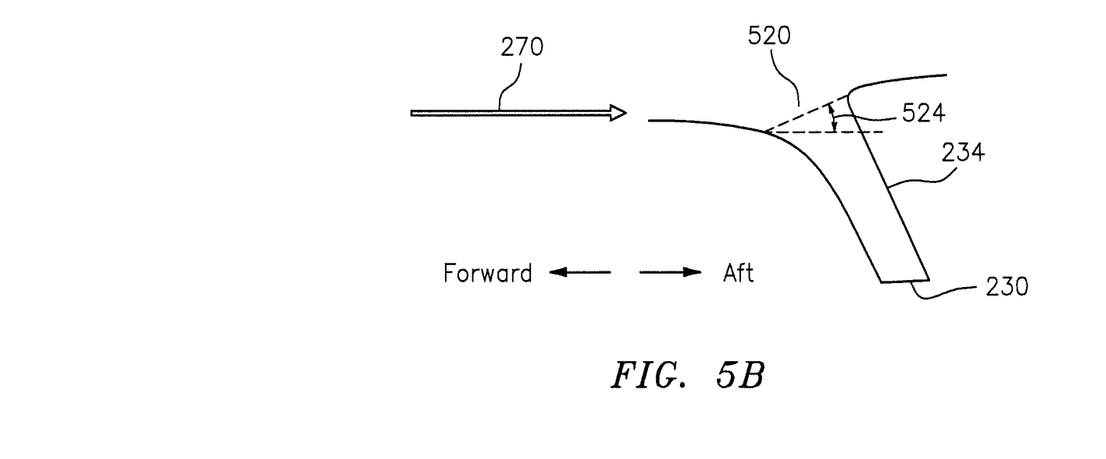

Referring to FIGS. 5A-5B, the flow 270 is shown as detaching at a separation point 504. The resulting shear layer 508 over the duct opening 520 may excite the cavity or open-close duct. Depending on an angle 524 (measured relative to the direction of the flow 270 upstream of the fences) between the opening 520 and the flow 270, the excitation mechanism could be turbulence shedding frequency in the shear layer 508, fluid compression (due to a RAM air effect), or a combination thereof. Regardless of the mechanism the flow fences 252 may be designed to modify the flow 270' such as to repress the coupling of the turbulence with the acoustic resonance of the duct geometry.

Depending on the angle 524, as well as the cavity or open-close duct dimensions, the response can be described by one or more of a cavity resonance mode, a quarter wavelength resonator, a spring-mass system, or a bypass duct or cavity axial/azimuthal/radial mode coupling.

Figure 6:
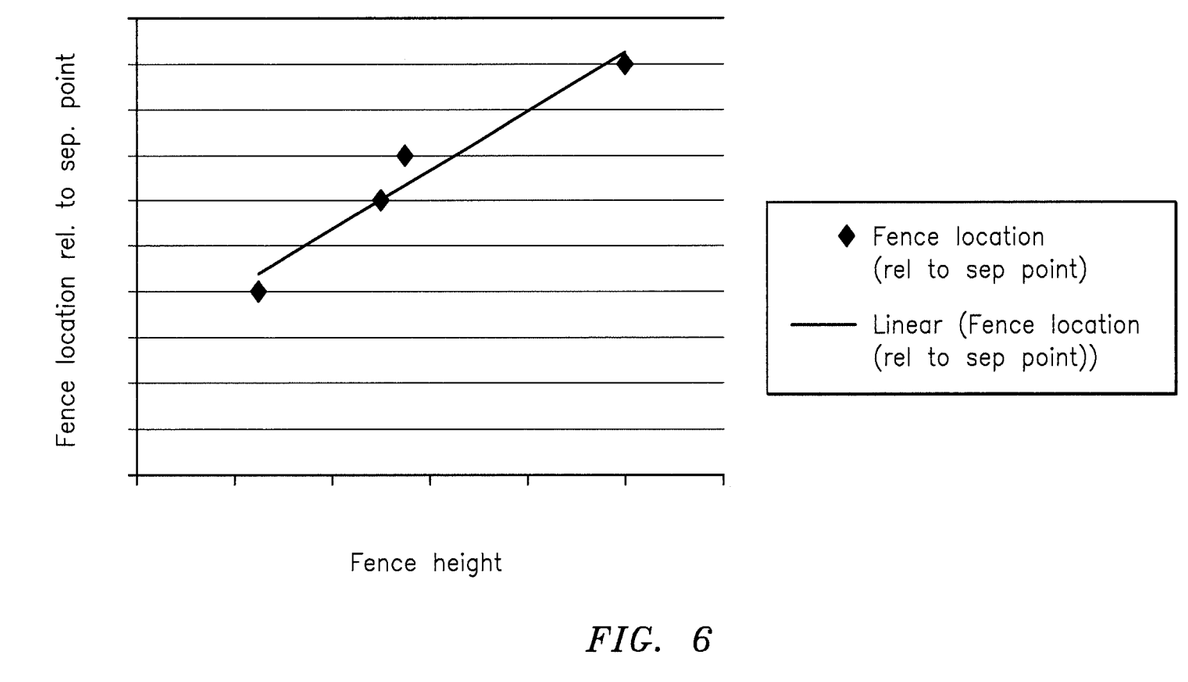
FIG. 6 illustrates a plot of a fence location, relative to a shear layer separation point, as a function of fence height in accordance with aspects of this disclosure.

Referring to FIG. 6, a plot 600 of data points of a fence (e.g. fence 252—see FIG. 2C)) location relative to a shear layer separation point (e.g., separation point 504—see FIG. 5A) is shown as a function of fence height, where the fence length is approximately the same as a cavity width. Superimposed in the plot 600 is a line that represents a first order approximation (or a curve-fitting) of the data points.

Technical effects and benefits of this disclosure include a decoupling of the shear layer turbulence over a duct intake from a duct response by reducing/eliminating the shear layer span-wise coherence via the use of one or more fences. The decoupling results in the reduction/elimination of a resonant tone (and any harmonics thereof). In this manner, the magnitude of the acoustic output is maintained within strict thresholds, as engine noise levels are substantially reduced. Furthermore, the use of a fence may reduce the risk for acoustic structural fatigue inside the duct.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A system associated with an engine of an aircraft comprising:
    a duct;
    an inlet coupled to the duct and disposed in a surface; and
    an array of fences coupled to at least one of the inlet and the surface upstream of the inlet so as to condition an airflow proximate the inlet, the array of fences extending outward from the respective at least one of the inlet and the surface in a same direction;
    wherein at least one fence of the array of fences extends non-linearly between opposing lengthwise ends of the at least one fence; and
    wherein at least one other fence of the array of fences extends linearly between opposing lengthwise ends of the at least one other fence.

2. The system of claim 1, wherein a fence of the array of fences has a height that is substantially uniform over a length of the fence.

3. The system of claim 1, wherein a fence of the array of fences includes a plurality of segments.

4. The system of claim 3, wherein each of the segments has a segment length that is substantially the same.

5. The system of claim 3, wherein each of the segments has a maximum height and a minimum height, and wherein the minimum height is less than the maximum height.

6. The system of claim 1, wherein a fence of the array of fences includes a plurality of serrations.

7. The system of claim 6, wherein each of the serrations has substantially the same length.

8. The system of claim 6, wherein each of the serrations has substantially the same height.

9. The system of claim 1, wherein a fence of the array of fences projects from at least one of the inlet and the surface and the fence has a thickness and a height measured from the respective at least one of the inlet and the surface that is substantially uniform over the thickness.

10. The system of claim 1, wherein a fence of the array of fences projects from at least one of the inlet and the surface and the fence has a thickness and a height measured from the respective at least one of the inlet and the surface that varies over the thickness.

11. The system of claim 1, further comprising:
a valve body coupled to the duct.

12. The system of claim 11, wherein the valve body includes at least one valve that is configured to rotate between a closed state and an open state.

13. The system of claim 1, further comprising:
a bifurcator coupled to the inlet.

14. The system of claim 1, further comprising:
a nacelle coupled the duct; and
a pylon coupled to the nacelle.

15. The system of claim 1, wherein the array of fences comprises a first fence and a second fence, the second fence located axially downstream from the first fence.

16. The system of claim 15, wherein the first fence has a first length and the second fence has a second length that is different from the first length.

* * * * *